Patented Mar. 14, 1950

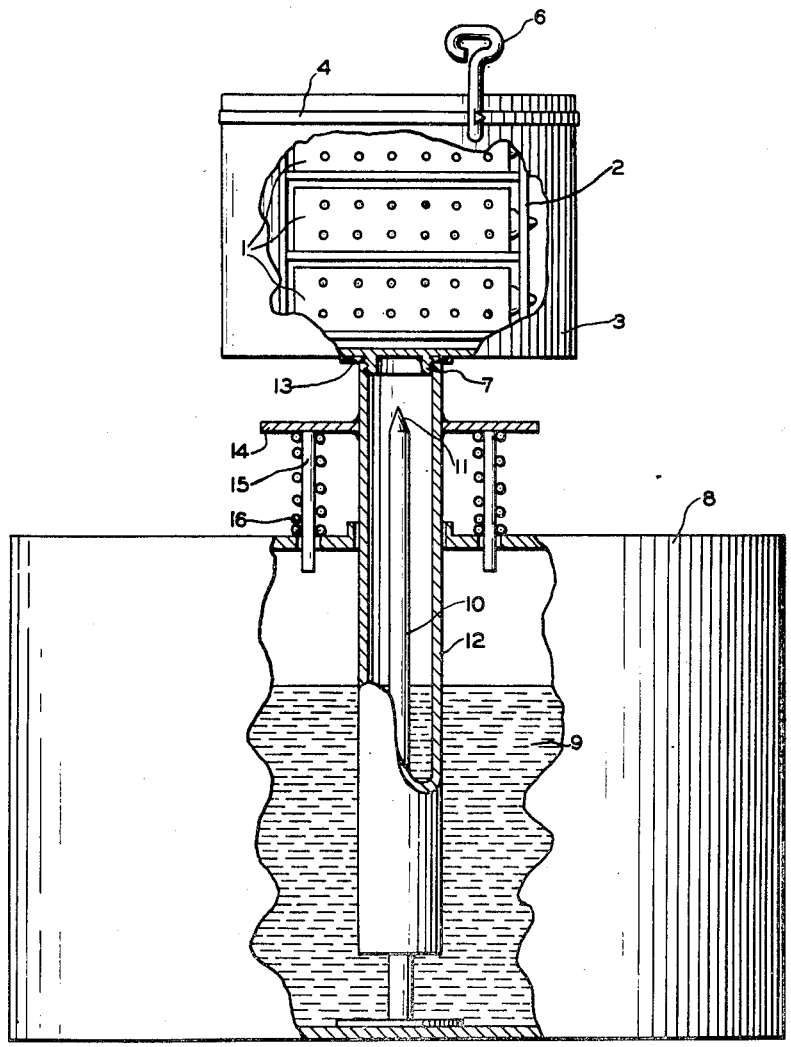
INVENTOR.
GRENVILLE B. ELLIS
BY William D. Hall
ATTORNEY

2,500,169

UNITED STATES PATENT OFFICE 2,500,169

BATTERY FILLER DEVICE HAVING A PUNCTURING ELEMENT FOR PIERCING AN EVACUATED BATTERY ENCLOSING CAN

Grenville B. Ellis, Red Bank, N. J., assignor to the United States of America as represented by the Secretary of War Application September 6, 1944, Serial No. 552,861

3 Claims. (Cl. 226—19)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to wet cell batteries and more particularly to means of filling very small wet cell batteries as used in radiosonde equipment.

In certain radiosonde equipment the power is furnished by small wet cell batteries. To prevent deterioration these batteries are transported without the acid mixture, such as sulfuric, in them. They are filled in the field just before use and, at full load, last about two hours. The batteries are very small and have tiny openings and hence were formerly filled by means of a hypodermic needle which was slow and laborious in the field.

One method which is now being utilized is to enclose the batteries in a partially evacuated glass container having a glass tip. To fill the batteries the glass tip is submerged in the acid mixture and then broken off. The difference in pressure causes the acid mixture to enter the glass container and also the batteries. It is then necessary to break the glass container for removal of the actuated batteries. This method is objectionable because of the problems of transporting glass and the possibility of injury in breaking the glass for the removal of the batteries. My invention eliminates these objections.

One object of my invention is to provide a metal evacuated can containing the batteries to be filled, with means for fastening it to a metal pipe with an airtight seal therebetween, and with means for opening the can by the strip-key method.

Another object of my invention is to provide a container partially filled with the acid mixture, such as sulfuric (1.350 sp. gr. for one shot service: 1.280 sp. gr. for cycling), with a sharp thrust pin extending upwardly from the bottom.

These and other objects will appear hereinafter from the following description and drawing.

Referring to the drawing, which is for illustrative purpose only:

The single figure is an elevational view. The batteries 1 are retained in a cradle 2 within a partially evacuated metal can 3 of the type used for vacuum-packed foods and the like. To conserve transportation space and acid mixture, the can is so designed so as to fit closely about the batteries and the cradle. The can 3 has an opening strip 4 removable by means of a key 5. To the underside of said can is joined a short length of externally threaded tubing 7.

The battery filling unit consists of a container 8 to hold an acid mixture 9. Within said container and fastened to the bottom thereof is an upwardly extending thrust pin 10, terminating in a sharp point 11. About the thrust pin and vertically slideable through an opening in the top of the container is a tube 12. The tube 12 is internally threaded at its upper end for attachment to a tubing 7 and is also provided, at its upper end, with a resilient gasket 13 for an airtight connection with said tubing 7. The tube 12 is fitted with an external annular flange 14 having vertical guide bars 15 which extend through guide holes in the top of the container 8, each guide bar being provided with a coil spring 16.

To fill the batteries within the can 3 the tube 7 is screwed into the tube 12. The springs 16 should have sufficient stiffness to sustain the can 3 in the position shown in the drawing while it is being screwed into place. The can 3 is then pushed downward until its bottom is pierced by the thrust pin 10. Due to the reduced pressure within the can 3 caused by the exhaustion of air by the vacuum-pack method, the acid mixture 9 which is under normal atmospheric pressure since the container 8 does not have an airtight seal, flows up into the can 3 and fills the batteries 1 because the air contained in the small holes in these batteries is under the same pressure as the air in the can itself. The can 3 is then opened by means of the key 5 and the activated batteries removed therefrom. The batteries are then wiped off and inserted into the radiosonde equipment or the like.

While the form of embodiment of my invention as herein disclosed constitutes a preferred form, it is to be understood that other forms might be adapted, all coming within the scope of the claims.

Having thus described my invention I desire to secure by Letters Patent and claim:

1. A device for filling secondary batteries comprising an evacuated chamber member for said batteries, an electrolyte container, airtight tubular connecting means for said chamber member and said container, said chamber member and tubular connecting means being movably connected to said electrolyte container, means fixed to said electrolyte container and extending within said connecting means for piercing said evacuated chamber member upon movement between said evacuated chamber and said electrolyte container.

2. A device for filling wet cells comprising an evacuated can for containing said wet cells, an electrolyte container, an airtight tubular connecting means for said can and said container, said can and tubular connecting means being movably connected to said electrolyte container, and a pointed member fastened to said container and extending within said airtight tubular connecting means for puncturing said evacuated can upon movement between said evacuated can and said container.

3. A device for filling storage cells comprising a can for containing storage cells and air under reduced atmospheric pressure, a sulphuric electrolyte container, an airtight tubular connecting means for said can and said container, said can and said tubular connecting means being movably connected to said electrolyte container, and a puncturing means fastened to said container and extending within said airtight tubular connecting means for puncturing said can upon movement between said can and said container.

GRENVILLE B. ELLIS.

REFERENCES CITED

The following references are of record in the file of this patent:

UNITED STATES PATENTS

| Number | Name | Date |
| --- | --- | --- |
| 1,198,619 | Clymer | Sept. 19, 1916 |
| 1,657,782 | Berg | Jan. 31, 1928 |

FOREIGN PATENTS

| Number | Country | Date |
| --- | --- | --- |
| 25,289/94 | Great Britain | Dec. 29, 1894 |

OTHER REFERENCES

Willard: Automotive Industries, August 1, 1944, page 40.